Dec. 2 1952     M. O. SMITH ET AL     2,620,058
CONTAINER FEED MECHANISM
Filed July 11, 1947     4 Sheets-Sheet 1
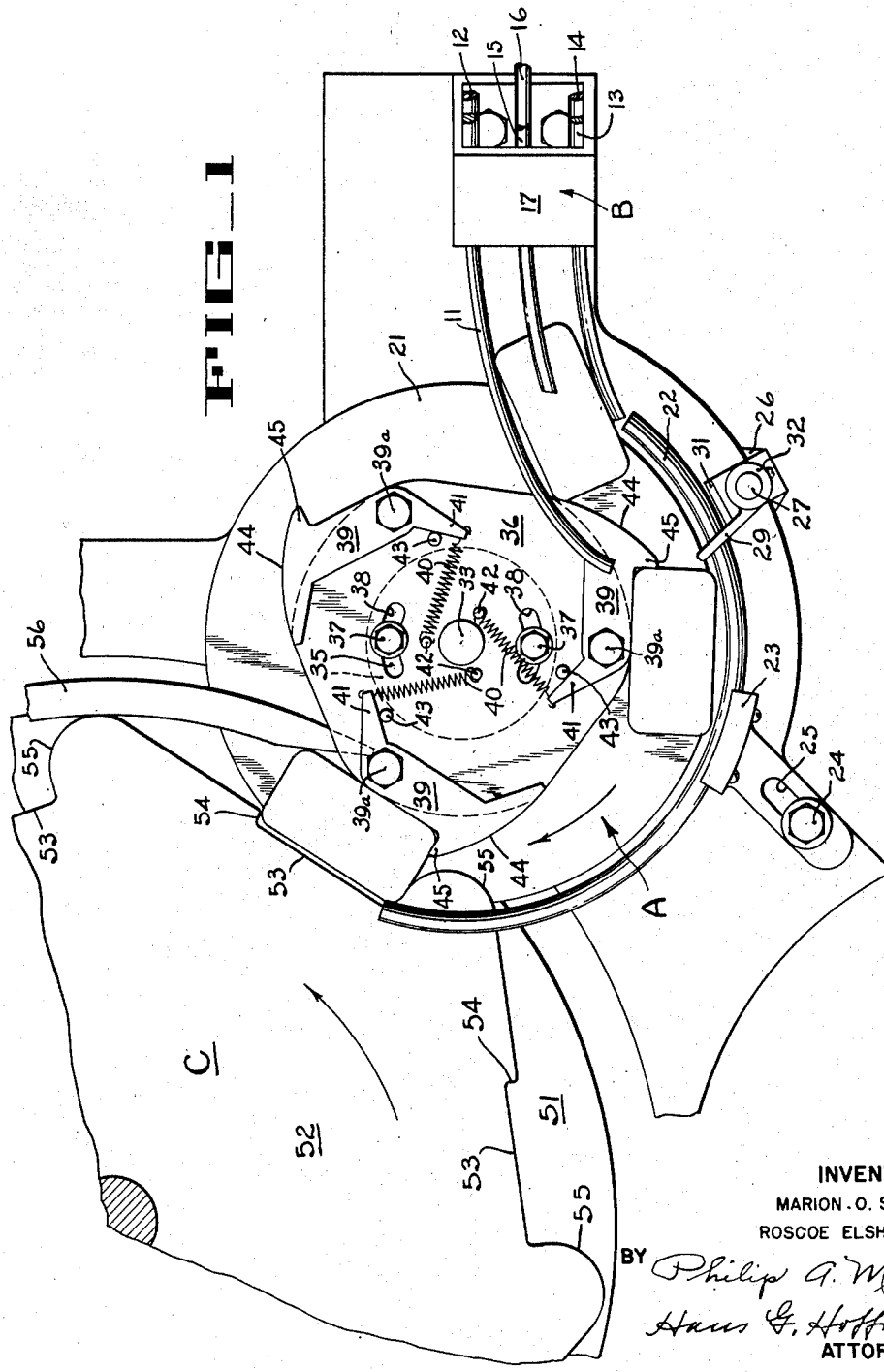
INVENTORS
MARION. O. SMITH
ROSCOE ELSHEIMER
BY Philip G. Minnis
Hans G. Hoffmeister
ATTORNEYS Dec. 2 1952　　M. O. SMITH ET AL　　2,620,058
CONTAINER FEED MECHANISM
Filed July 11, 1947　　4 Sheets-Sheet 2
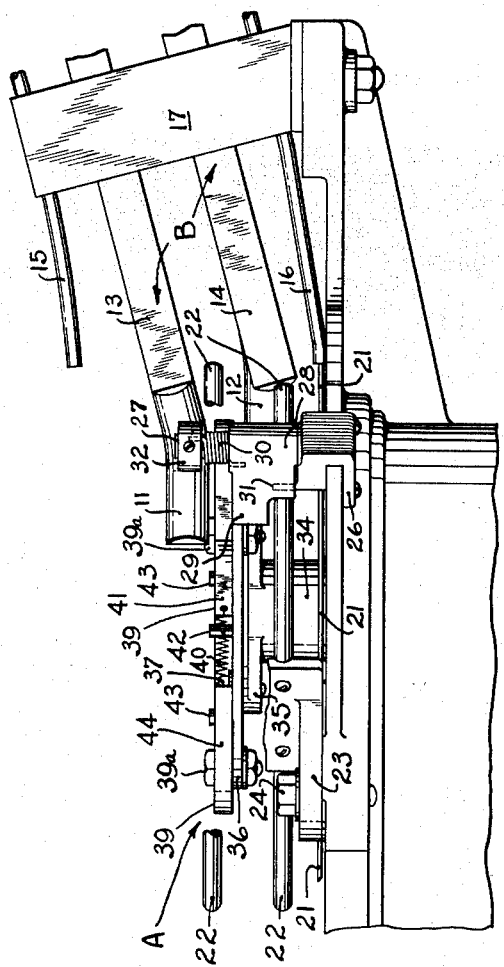
FIG_2
INVENTORS
MARION O. SMITH
ROSCOE ELSHEIMER
BY Philip G. Minnis
Hans G. Hoffmeister
ATTORNEYS

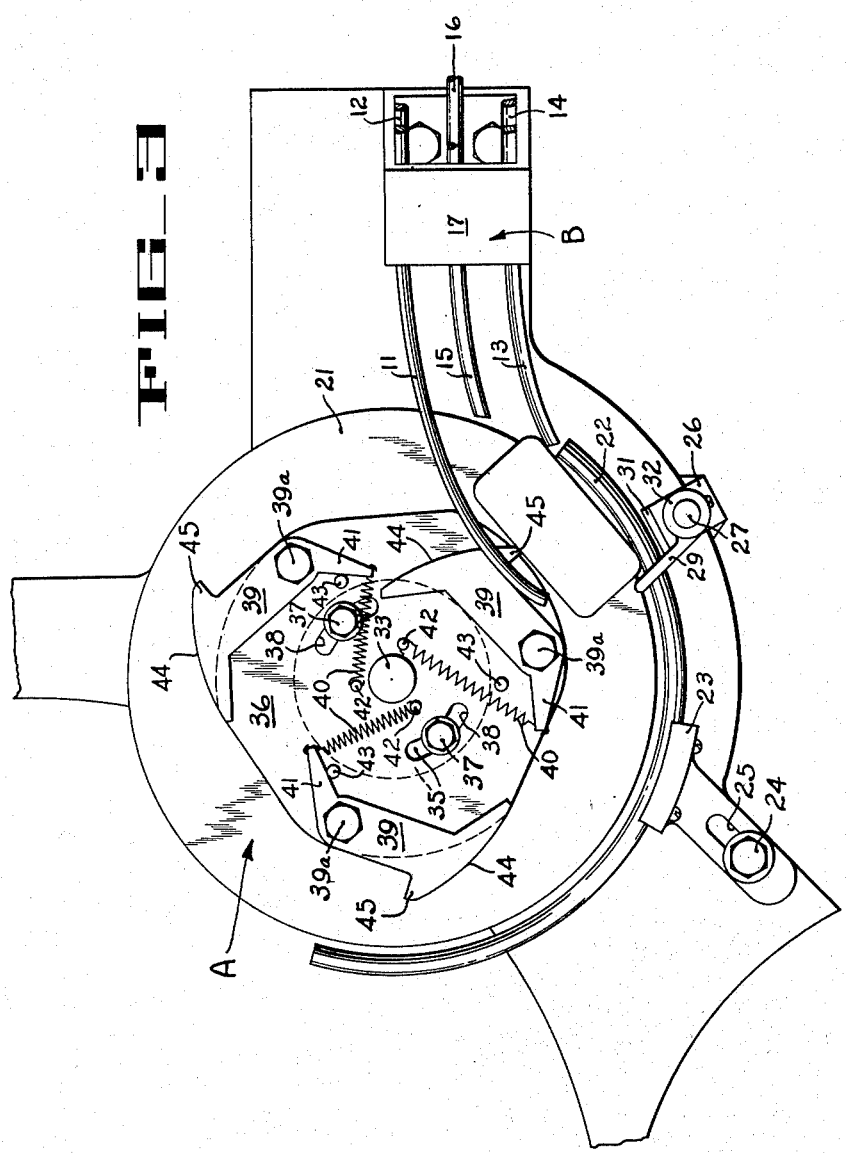

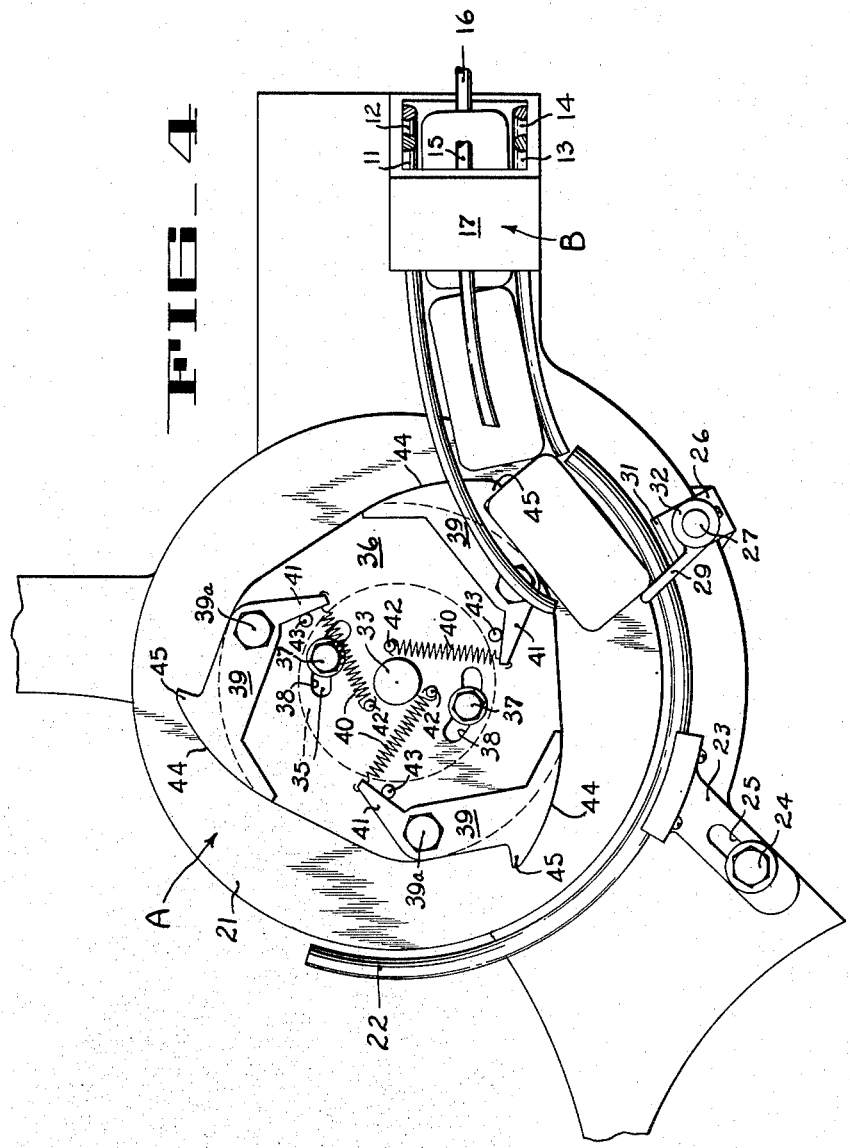

UNITED STATES PATENT OFFICE 2,620,058

CONTAINER FEED MECHANISM

Marion O. Smith and Roscoe Elsheimer, Hoopestown, Ill., assignors to Food Machinery and Chemical Corporation, a corporation of Delaware Application July 11, 1947, Serial No. 760,216

5 Claims. (Cl. 198—25)

The present invention relates to feeding mechanisms adapted for use in connection with container-handling machines such as can fillers, labelers, and the like.

A container-handling machine is commonly provided with a moving carrier, such as a rotary table, having means for holding the upstanding containers in spaced relation to present them successively to the operation of the machine. In addition, a machine of this type is generally associated with a moving supply line conducting the containers to the machine table, and on such a supply line the successive containers arrive usually in abutting or closely spaced relation. Thus, there is an appreciable difference between the spacing of the containers on the machine table and on the supply conveyor and it is, therefore, necessary that the transfer of the containers from the supply line to the machine table be properly controlled so as to avoid congestions which may damage the containers and interrupt the operation of the machine.

For this purpose it is customary to interpose a timing mechanism between the operating table of the machine and its supply line. This timing mechanism takes usually the form of a wheel which turns in synchronized relation with the operating table and possesses a number of radially projecting arms arranged to pass over the supply line. These arms engage cyclically behind the foremost ones in the procession of approaching containers and conduct them individually over a semi-circular path, determined by an arcuate guide rail disposed around part of the periphery of the transfer wheel, to the operating table of the machine.

Mechanisms of this type give satisfactory performance only as long as the continuity of the approaching container procession is maintained. If this procession is interrupted while the machine continues to operate, a later resumption of the container supply is liable to disrupt the arrangement because if the first container of a new supply procession should arrive slightly too late at the place of take-off for one of the separating arms to engage behind its rear wall, the container may be laterally wedged between the edge of the guide rail and the tip of the transfer arm and thus block the mechanism and in turn be destroyed.

Difficulties of this type are especially apt to occur in arrangements which employ gravity-type supply lines such as chutes and slides, wherein proper positioning of the supplied articles at the end of the chute for engagement by the transfer arms of the timing mechanism may depend upon the pressure exercised by the weight of immediately succeeding containers.

The present invention aims to furnish a simple yet effective and dependable arrangement for transferring containers from a supply line to the operating table of a container-handling machine in properly timed relation.

It is one of the objects of the present invention to provide an arrangement for transferring containers from a supply line to the operating table of a container-handling machine wherein the danger for containers to be accidentally damaged or destroyed or for the machine to be disrupted is reduced to a minimum.

A further object of the invention is to furnish a container transfer mechanism of the rotary disc type including a plurality of circumferentially arranged separating arms and a concentrically disposed guide rail, wherein any possibility of containers to be wedged in between one of the arms and the guide rail is eliminated disregarding any interruption in the continuity of the container supply.

It is an additional object of the invention to provide an arrangement of the type described wherein each of said separating arms is adapted to position a belatedly arriving container into proper position to be effectively drawn into the transfer mechanism by a following arm.

It is yet another object of the present invention to provide a transfer mechanism for use in connection with a supply line of the chute type, which will appropriately draw the last container of a procession of containers into its operating cycle, even though said last container may lack the gravitational push exerted by succeeding containers in the chute.

Furthermore, it is an object of this invention to furnish a supply chute, for use in connection with transfer mechanisms of the type including a rotary arrangement of separating arms, which is adapted to automatically adjust the position of the foremost one of a procession of descending containers relative to the directly succeeding container so as to cause individual engagement of said foremost container by said separating arms.

These and other objects of the invention will appear from the following description of the accompanying drawing which illustrates a preferred embodiment thereof, and wherein:

Figure 1 is a plan view of a transfer mechanism constructed in accordance with our invention, showing the discharge end of an associated supply chute and part of the operating table of a container-handling machine.

Figure 2 is a fragmentary elevation of the same transfer mechanism and the discharge end of its associated supply chute.

Figure 3 is another plan view of the transfer mechanism of our invention showing said mechanism in the process of drawing a "last" container from the discharge end of the supply chute.

Figure 4 is still another plan view of the transfer mechanism, similar to Figure 3, but in a different operational position.

In the accompanying drawing a transfer mechanism A is interposed between the discharge end of a supply chute B and the operating table C of a can-handling machine.

The supply chute B is intended for the delivery of cans of substantially rectangular cross-section and accordingly is formed by each two vertically superposed side bars 11, 12 and 13, 14, respectively, and a top and bottom rod 15 and 16, respectively, which are rigidly held in their proper relative positions by a number of frame-like braces 17. Only the lowest one of these braces which is rigidly supported upon a suitable extension of the machine frame is shown in the drawings.

In the illustrated embodiment the top and bottom rods 15 and 16 are of cylindrical shape, while the side bars 11 to 14 are of semi-circular cross section with their round surfaces facing inwards so as to minimize any friction between the bars and a can sliding within the chute formed by said bars.

The bars and rods 11 to 16 may be arranged at an incline, or they may be of arcuate shape corresponding to a lower quadrant of a vertically positioned circle, so that the forces of gravity will cause cans fed into the upper end of the chute to slide toward a circular disc or table 21 disposed at the lower end thereof, as shown, and which forms part of the transfer mechanism A. The lower ends of bars and rods 11 to 16 are somewhat curved around a vertical axis, as may best be seen from Figures 1 and 3, so as to cause the discharge end of the chute to turn tangentially with respect to circular disc 21.

It should be noted that the upper one of the rear bars, namely bar 11, is arcuately extended over the disc 21 while the front bars 13 and 14 terminate approximately at and above the edge of said disc and in close proximity to a pair of vertically superposed guide rails 22 concentrically arranged around part of the edge of circular disc 21. These arcuate guide rails 22 are held in their proper relative positions at and above the edge of disc 21 by a bracket 23 which is mounted upon the machine frame for radial adjustment relative to disc 21 in any suitable manner, such as by means of a cap screw 24 engaging an elongated slot 25 provided in the foot of bracket 23, as shown in Figures 1 and 3.

Another bracket 26 is rigidly mounted upon the machine frame adjacent to the edge of disc 21 approximately in radial alignment with the terminal point of the arcuately extended rear bar 11 of chute B. This bracket 26 carries a cylindrical upright 27 upon which is journaled a collar 28 provided with a radially projecting finger 29. A suitable spring means in the form of a coil spring 30 disposed around pivot 27 is provided to constantly urge finger 29 in clockwise direction (as viewed in Figures 1 and 3) against a stop lug 31 extending upwardly from bracket 26 and which is so positioned as to cause finger 29 to project radially over the edge of disc 21. While one end of coil spring 30 engages finger 29 or its supporting collar 28, respectively, the other end of said spring may be anchored in a suitable setting collar 32 arranged on top of pivot 27 to provide means for adjusting the tension of coil spring 30.

The transfer mechanism A includes the repeatedly mentioned circular table 21 which may be rigidly supported from the machine frame or may be arranged to partake in the clockwise rotary motion of the actual transfer implements. A vertically disposed power shaft 33 protrudes upwardly through the center of circular plate 21 and has keyed upon its upper end a hub 34 provided with a horizontal flange 35 which supports another plate 36 a suitable distance above plate 21. To permit rotary adjustment of plate 36 relative to hub 34 and powershaft 33, this plate is attached to flange 35 by two cap screws 37 which engage two arcuate slots 38 provided in the plate 36.

The plate or disc 36 has the shape of mutilated triangle the corners of which have been sheared and rounded off, as shown, and is of a smaller average radius than circular table 21 by a distance corresponding roughly to the width of the cans to be transported from the chute B to the machine table. In place of its sheared corners plate 36 possesses three transfer arms 39 which are formed in the manner of spring pawls and are suitably pivoted to plate 36 at points 39a near its periphery.

Each arm 39 is yieldably held in clockwise position (as viewed in Figures 1 and 3) by a contractible spring 40 disposed between its tail 41 and a suitable stud 42 projecting upwardly from the disc 36 near the center thereof, with the clockwise edge of the tail 41 bearing against a suitable stop 43 mounted upon plate 36. The opposite end of the arm 39 is extended to form a head, somewhat after the fashion of an ax, presenting a slightly arched edge 44 toward the exterior and forming a beak or hook-like projection 45 at the clockwise end of said edge as shown.

In the extreme clockwise position of the arm 39 as determined by stop 43 the beak 45 is projected beyond the edge of disc 36 and over the space between the peripheries of the lower plate 21 and the upper plate 36. In this position the counter-clockwise end of the arched edge 44 is aligned with the periphery of the disc 36 so that the adjacent edge portion of the disc 36 forms a smooth continuation of the arched edge 44 of the transfer arm 39.

As shown in Figure 1, the container-handling machine C is located adjacent to the transfer mechanism A at a point diametrically opposite to the discharge end of the supply chute B. The machine C includes a stationary table 51 of circular shape which is disposed slightly below the level of, and is somewhat overlapped by the circular disc 21 of the transfer mechanism A. The machine also includes a concentrically arranged rotary star wheel 52 having a plurality of peripheral pockets 53 spaced equal distances apart. The star wheel 52 is arranged to rotate in opposite direction to the transfer disc 36. The leading end of each pocket 53 is formed by a narrow ledge that presents a seat 54 against which the leading outer corner of a container in process of transfer from mechanism A to machine C may bear. The rear end of each pocket 53 is formed by a heel 55 which is of rounded contour to permit unobstructed entry of the angular rear portion of a container into the pocket 53, yet is of sufficient radial depth to engage behind and act as propeller for each transferred can during its travel around machine table 51.

A guide rail 56 is concentrically arranged around a part of the machine table 51 somewhat below the level of transfer arms 39 and extends over a portion of the disc 21 to a point somewhat ahead of the terminal points of the guide rails 22, as shown in Figure 1.

In operation the containers slide down chute B in a solid line with their narrow sides in contact with one another. As they pass through the discharge end of the chute, they are progressively turned around a vertical axis into alignment with the direction of movement of the transfer mechanism A, due to the described curvature of the end portions of chute bars 11 to 14. Hence, the containers will move tangentially into the space between the edge of transfer disc 36 and guide rails 22. Moreover, owing to the extension of the upper rear bar 11 beyond the front bars 13 and 14, and also owing to the increased curvature of said extension, the foremost container will be turned markedly with respect to the directly subsequent one so that the confronting walls of the first two containers diverge to form a V-shaped gap, as shown in Figure 4.

Due to the momentum of its downward movement, and also due to the pressure exerted by the weight of consecutive containers, the foremost container moves onto table 21 between guide rails 22 and the edge of transfer disc 36 until it strikes the previously described stop finger 29. In the position thus determined the foremost container will remain until clockwise rotation of the disc 36 transfers the hooklike projection 45 of a transfer arm 39 into engagement therewith. The location of stop 29 relative to the end of supply chute B is so related to the length of the containers that the above described V-shaped gap, between the rear wall of a container resting against stop 29 and the front wall of a directly successive container, is located in the path of travel of hooks 45 in projected positions so that the first of said hooks to arrive will engage the inner rear corner of the foremost container forcing said container to participate in its clockwise rotary movement. It should here be noted that the hook 45 is of such shape and position relative to the outer edge of the transfer arm 39, from which it projects, as to form a rectangular seat adapted to securely receive the inner rear corner of a container.

Moreover, since the counterforce represented by the inertia of a properly positioned container is exerted in a direction parallel and closely spaced to the radius of the transfer arm 39 in its clockwise position, the arm 39 is unable to yield to properly positioned containers and the propelling force exerted upon such containers by a transfer arm 39 is therefore substantially positive.

Under this force the yieldable stop 29 is turned backwards against the urgency of its spring 30 so that the container may now travel freely past said stop and along the semi-circular path determined by guide rails 22 to a point where said guide rails 22 terminate and until the inner wall of the container is engaged by the previously described guide rail 56 disposed around a part of the machine table 51 and extending arcuately over the transfer mechanism A, as shown in Figure 1. This guide rail forces the leading outer corner of the container into engagement with the ledge 54 of a star wheel pocket 53, moving into registry with the transfer arm 39, and thus twists said container out of driving engagement with the propelling hook 45 thereof. However, before the hook 45 of transfer arm 39 has fully released the container, the rounded heel 55 of the star wheel pocket 53 moves into position behind the outer rear edge of the container forcing said container to participate in the rotary movement of the star wheel 52. Thus, the container will now travel along the interior edge of guide rail 56 and around the machine table 51 while the yieldable arm 39 moves out of engagement with the container.

It will be understood that for proper operation of the described arrangements the speed and the operational phases of the transfer disc 36 and the star wheel 52 have to be very carefully synchronized relative to one another so that every transfer arm 39 in its travel past the machine C coincides very accurately with a pocket 53 in the star wheel 52 thereof.

The described operations occur in their proper manner as long as there is an uninterrupted procession of containers sliding down supply chute B to push a new container into the advanced position in which its inner rear corner may be appropriately engaged by an approaching transfer arm 39 every time a foremost container has been removed past the yieldable stop 29.

In practice, however, situations will arise in which these ideal conditions do not exist. It is in such situations that the arrangement of the present invention is of particular advantage. Thus, during operation of a container-handling machine the continuity of supply may be interrupted for a number of different reasons. In such an event the last container of an exhausted supply procession, devoid of the gravitational push exercised by succeeding containers, may fail to advance as far as stop finger 29 and may come to rest in a position in which an approaching transfer hook 45 may strike the vertical inner wall of the container and wedge it against the outer guide rails 22. This would normally crush the container and block, if not damage, the transfer mechanism A making it necessary to interrupt the operation of the machine so as to restore proper working conditions.

In the present arrangement, however, due to the yieldability of the transfer arm 39 in clockwise direction, as established by the pivot 39a and the contractible spring 40, the transfer hook 45 will yield backwardly as the arm advances along its rotary path, and will engage the inner vertical wall of the container with no more force than is necessary to drag the container along. Thus, the inappropriately positioned container is drawn fully into the transfer mechanism A as illustrated in Figure 3. The indirect force applied to the container by yieldable hook 39, however, is unable to overcome the strength of coil spring 30 which urges the stop finger 29 into blocking position. Hence, movement of the container will be arrested as soon as its front wall strikes the finger 29 whereupon the hook 45 will slide forwardly off and away from the inner container wall leaving said container in proper position for positive transfer engagement by a subsequently arriving arm 39. Thus, there is no danger that the retracted arm 39 may drag the container across the total transfer path and deliver it to the star wheel 52 of the machine C in an out-of-phase relation.

Hence, in accordance with the present invention the transfer arms 39 are adapted to serve a double function, namely (1) to positively propel properly positioned containers from the discharge end of the supply chute into engagement with the star wheel 52, and (2) to yieldably adjust improperly positioned containers to an appropriate initial position wherein they may be positively engaged by a subsequent transfer arm.

A situation similar to the one described may arise at the beginning of a supply train if the foremost container thereof should happen to slide through the discharge end of the supply chute at the very moment when one of the transfer hooks 45 advances into the path defined by the end of the chute. In such an event, the hook will again catch the inner vertical wall of the container urging it against the guide rails 22 on the opposite side thereof. In the arrangement of the present invention this will cause no harm to the container and the yieldable hook 45 will merely carry it in a manner previously described into a position in which it may be properly engaged by the next one in the cycle of transfer arms.

As a third alternative, a first container may pass through the discharge end of the supply chute shortly after a transfer hook 45 has entered the path defined by the chute. In such an event, the leading inner corner of the container will strike against the gently curved edge 44 of the arm 39 which will temporarily restrain or retard further advance of the said container, such a condition being illustrated in Figure 1. As the arm travels on, its curved edge 44 glides smoothly across the leading inner corner of the container, causing no injury whatsoever, and will eventually permit the container to follow gradually under the force exerted thereon by the weight of successive containers until its front wall strikes stop finger 29 and the said container is in proper position for positive propelling engagement by the next one in the sequence of the rotating arms.

Thus, no matter what situations may arise due to irregularities and interruptions in the supply of containers, the transfer arrangement of the invention is such that accidental destruction of containers and disruption of the machine operation is dependably eliminated. Therefore, container-handling machines associated with supply and transfer mechanisms constructed in accordance with the invention may be allowed to operate without need for constant supervision of the supply conditions.

While we have explained our invention with the aid of a specific embodiment thereof, we do not wish to be limited to the constructional details shown which may be departed from without departing from the scope of the invention. Thus, the transfer mechanism may comprise more or even less than three transfer arms 39, and the chute may be composed of more or less than six bars or rods respectively. Also, those skilled in the art will readily be able to adapt the principle of our invention to containers of other than rectangular shape.

Having thus described our invention and the manner in which it is to be performed, what we claim is:

1. Arrangement for delivering containers to a container-handling machine including a horizontal base plate, a horizontal disc mounted for rotary movement a distance above said plate, guide means disposed in spaced concentric relation around a portion of said disc, a chute descending radially toward said disc and bent to discharge tangentially into the arcuate space defined by said guide means and the edge of said disc in the direction of movement of said disc, a number of transfer levers pivotally mounted upon said disc in circumferentially spaced relation adjacent the periphery thereof and each having a tail extending in the direction of movement of said disc and an arm extending in opposite direction, a hook projecting rectangularly from each of said arms and arranged to form a container seat, spring means disposed between the tail of each of said levers and points near the center of said disc to yieldably urge said levers into positions in which said rectangular hooks project beyond the periphery of said disc, positive stop means to limit pivotal movement of said arms under the urgency of said spring means to positions tangentially of said disc adjacent the point of pivotal mounting, and yieldable stop means protruding into said arcuate space a predetermined distance in front of the end of said chute and adapted to resiliently restrain movement of all but positively propelled containers toward said container handling machine.

2. Arrangement for delivering containers to a container-handling machine including a base plate, a disc mounted for rotary movement above said plate and adjacent to said machine, a guide rail disposed in spaced concentric relation around a portion of said disc, a supply chute descending radially toward said disc and arranged to discharge tangentially into the arcuate space defined by said guide rail and the edge of said disc in the direction of movement of said disc, a number of transfer levers pivotally mounted upon said disc circumferentially thereof, each of said levers having a lateral projection arranged to extend radially beyond the periphery of said disc and adapted to form a container seat, means resiliently connecting said levers to said discs, said levers being arranged to positively resist tangential forces acting against rotary advance of said projections within said arcuate space yet adapted to yield to forces exerted in radial direction, and resilient stop means protruding into said arcuate space a predetermined distance in front of said supply chute and adapted to yield to tangential forces of predetermined strength.

3. Arrangement for delivering containers to a container handling machine including a disc mounted for rotary movement adjacent said container handling machine, arcuate guide means disposed in spaced concentric relation around a portion of said disc and terminating at a point adjacent said container handling machine, means for discharging containers into the space defined by said guide means and the periphery of said disc at a point spaced from said container handling machine, a yieldable stop element projecting into said space to resiliently restrain movement of all but positively-propelled containers toward the container handling machine, a transfer arm pivotally mounted on said disc adjacent the periphery thereof and having a rectangular projection spaced from the point of pivotal mounting on said disc and arranged to form a container seat, and spring means adapted to yieldably hold said arm in a tangential position relative to said disc adjacent the point of pivotal mounting with said rectangular projection extending beyond the periphery thereof whereby said projection is adapted to substantially rigidly engage an end of a container in said space to positively propel the same past said yieldable stop element to the container handling machine.

4. Arrangement for delivering containers to a container handling machine including a horizontal base plate, a horizontal disc mounted for rotary movement a distance above said plate, arcuate guide means disposed in spaced concentric relation around a portion of said disc and terminating at a point adjacent said container handling machine, means for discharging containers into the space defined by said guide means and the periphery of said disc at a point spaced from said container handling machine, a yieldable stop element projecting into said space to resiliently restrain movement of all but positively-propelled containers toward the container handling machine, a transfer arm pivotally mounted on said disc adjacent the periphery thereof and having a rectangular projection spaced from the point of pivotal mounting and arranged to form a container seat, and spring means adapted to yieldably hold said arm in a tangential position relative to said disc adjacent the point of pivotal mounting with its rectangular projection extending beyond the periphery thereof whereby said projection is adapted to substantially rigidly engage an end of a container in said space to positively propel the same past said yieldable stop to the container handling machine.

5. Arrangement for delivering containers to a container handling machine including a horizontal base plate, a horizontal disc mounted for rotary movement above said plate, arcuate guide means disposed in spaced concentric relation around a portion of said disc and terminating at a point adjacent said container handling machine, means for discharging containers into the space defined by said guide means and the periphery of said disc at a point spaced from said container handling machine, a yieldable stop element projecting into said space at a predetermined position such that containers properly fed by said discharging means will abut said stop element, said element being of such resilience that movement of all but positively-propelled containers is restrained thereby, transfer arms pivotally mounted on said disc adjacent the periphery thereof in circumferentially spaced relation and each having a rectangular projection spaced from the point of pivotal mounting and arranged to form a container seat, and spring means adapted to hold each of said transfer arms in a tangential position relative to said disc adjacent the point of pivotal mounting with its rectangular projection extending beyond the periphery of said disc whereby said projections are each adapted to substantially rigidly engage an end of a container abutting said yieldable stop element to positively propel the same past said yieldable stop to the container handling machine.

MARION O. SMITH.
ROSCOE ELSHEIMER.

REFERENCES CITED

The following references are of record in the file of this patent:

UNITED STATES PATENTS

| Number | Name | Date |
|---|---|---|
| 1,339,060 | Hansen | May 4, 1920 |
| 1,430,132 | Wilberts | Sept. 22, 1922 |
| 1,467,442 | Mason | Sept. 11, 1923 |
| 1,556,991 | Hippenmeyer | Oct. 13, 1925 |
| 1,892,042 | De Markus | Dec. 27, 1932 |
| 2,004,492 | McNamara et al. | June 11, 1935 |
| 2,202,640 | Thomas | May 28, 1940 |
| 2,393,961 | Almgren | Feb. 5, 1946 |
| 2,393,997 | Lehmann | Feb. 5, 1946 |